May 10, 1960   W. LUPISH   2,936,208
FACSIMILE RECORDER
Filed March 20, 1953
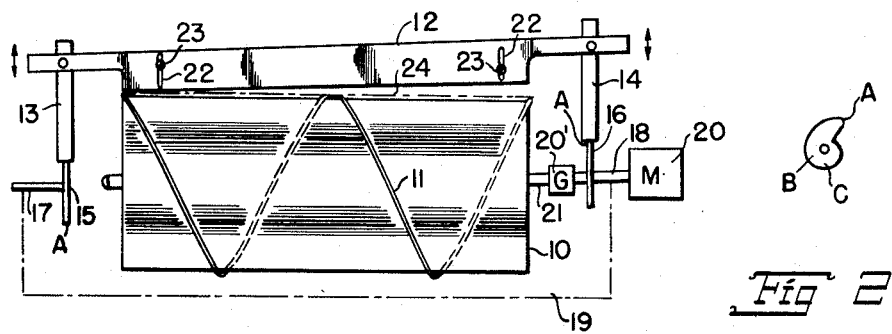
Fig. 1
Fig. 2
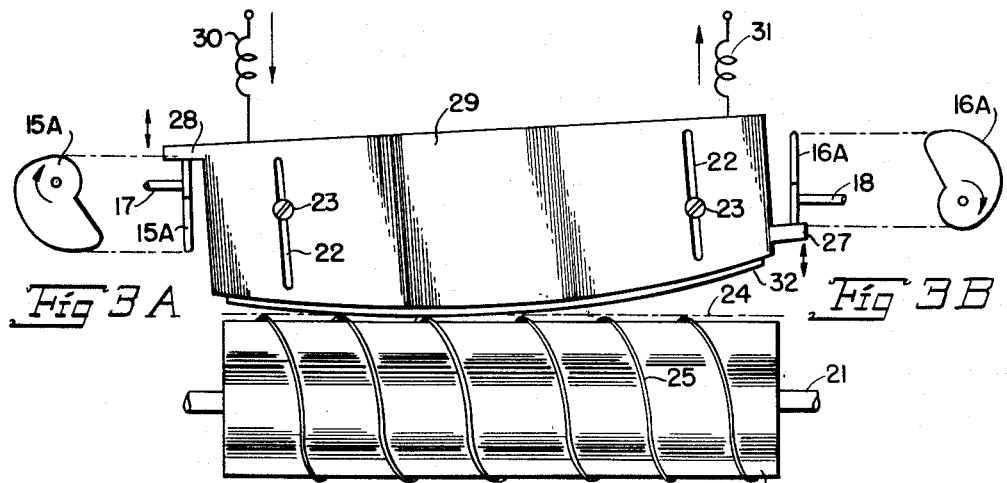
Fig. 3A   Fig. 3B
Fig. 3
INVENTOR
WALTER LUPISH
BY J. B. Burke
ATTORNEY

United States Patent Office 2,936,208
Patented May 10, 1960

2,936,208

FACSIMILE RECORDER

Walter Lupish, Flemington, N.J., assignor to Faximile, Inc., New York, N.Y., a corporation of Delaware Application March 20, 1953, Serial No. 343,703

10 Claims. (Cl. 346—101)

This invention relates to facsimile recording systems.

In one electrical facsimile recording system, copy is reproduced by drawing recording paper between a helical electrode and a linear electrode. The helical electrode is caused to rotate in coordination with the movement of the paper. An area of contact by the helical and linear electrodes with the paper moves across the paper as the helical electrode rotates. The paper is marked electrically or electro-chemically at the area of contact in accordance with electrical signals transmitted to the electrodes from a facsimile signal transmitter. In order to obtain optimum definition of recording, it is necessary that the area of contact approach as closely as possible to a square or rectangle. The angle of intersection of the electrodes should therefore approach 90 degrees. When a single turn helix wound on a drum of usual practical proportions is employed in association with a straight linear electrode, the pitch of the helix is such that the angle of intersection is approximately 45 degrees and the area of contact is a non-rectilinear parallelogram. In order to reduce the long diagonal of the parallelogram it has been proposed to employ a pair of adjacent helical electrodes rotating about parallel axes as disclosed in U.S. Patent No. 2,391,768, granted to A. Blain on Dec. 25, 1945. Such an arrangement of electrodes requires that the axes of the helices be precisely coplanar and parallel. Any irregularity of movement in the electrodes causes a displacement and distortion of the area of contact so that the desired uniform fineness of definition is not attained.

In the present invention it is proposed to reduce the pitch of the helical electrode by employing a multiturn helix in association with a linear electrode. The linear electrode is actuated by suitable cams to maintain its edge tangent to the helix so that a single area of contact between the electrodes is constantly maintained. The cams are actuated in coordination with the rotation of the helical electrode. By the arrangement as described the area of contact between electrodes approaches that of a square or rectangle. The edge of the linear electrode moves in a prescribed path in a plane including the axis of the helix and is effectively restrained to movement in that plane. Distortion of the area of contact between electrodes is thus avoided and fine definition of recording is maintained. By winding the helix with two or more turns and suitably shaping and actuating the linear electrode the present invention makes possible fine detailed direct recording of wide copy up to 48 inches or more while the overall size of the helix is kept within nominal dimensions. For example, it is possible in accordance with the present invention to obtain copy eighteen inches wide with fine definition by employing a helix having a diameter of the order of two inches, while a recorder employing a single-turn helix would require a helix diameter of twelve or more inches to obtain the same fineness of definition for the same width of copy.

It is an object of the invention to improve and maintain fine detail of recording in a facsimile system.

It is another object to provide a compactly arranged recorder having minimal dimensions and capable of producing recorded copy having fine definition.

It is a further object to provide a substantially rectangular recording area of contact between recording electrodes, which area is maintained substantially constant in size and shape.

It is a further object to provide a multiturn helical electrode operable in association with a linear electrode.

Other and further objects and advantages of the invention will become apparent to those skilled in the art from the following description taken together with the drawings wherein:

Fig. 1 is an elevational view of a facsimile recorder embodying the invention.

Fig. 2 is a side view of a cam employed in the recorder of Fig. 1.

Fig. 3 is an elevational view of a portion of a recorder embodying a modification of the invention.

Figs. 3A and 3B are side views of cams employed in the recorder of Fig. 3.

In Fig. 1 is shown a rotatable drum 10 on which is mounted an electrically conductive two-turn helix 11. The helix may be mounted as shown in my U.S. Patent No. 2,568,754, granted Sept. 25, 1951. A linear electrode 12 is supported with one edge in the plane of the axis of drum 10 by the pivoted shafts 13, 14. Cams 15, 16 shaped like cam C in Fig. 2 are mounted on rotatable shafts 17, 18. The shafts 17, 18 are connected as indicated by dotted line 19 so as to be driven by motor (M) 20. A gear system (G) 20' having a 2:1 reduction ratio is provided between shaft 18 and shaft 21 so that drum 10 rotates twice for each rotation of cams 15, 16. The electrode 12 is provided with slots 22 in which ride the shafts of pins 23. Pins 23 are supported by any suitable stationary means. The sides of slots 22 serve to guide the movement of electrode 12 in a plane of the axis of helix 11. As the cams 15, 16 rotate their edges slide on the bottom ends of shafts 13, 14. Cams 15, 16 are mounted to rotate 180° apart so that when cam 15 abuts shaft 13 at point B shown in Fig. 2, cam 16 abuts shaft 14 at point A. Points A and B are the extremities of the maximum and median radii respectively of the cams 15, 16. As the cams rotate a rocking motion is imparted to the linear electrode 12. Helix 11 is simultaneously rotated so that the area of contact of the edge of electrode 12 to helix 11 travels uniformly from end to end of the helix. In order to accomplish recording, a suitable recording medium which can be any known type of electrically markable recording sheet is drawn between the electrodes. This recording medium is indicated by dotted line 24. The movement of recording sheet 24 is coordinated with that of drum 10 by suitable gearing, not shown.

The edge of linear electrode 12 which contacts the helix 11 may be straight or curved. If the edge is straight, there will be a single position of drum 10 at which the straight edge simultaneously contacts both ends and midpoint of helix 11. At this single position three marks will simultaneously be made on the recording medium. Since these marks are usually of the order of one hundredth of an inch they will not be objectionable. They can of course be avoided by slightly shortening the helix or linear electrode or can be eliminated by interrupting the transmitted signal at the instant the electrodes are in this single marking position.

In the event that a helix having a long axial length is required for marking copy of extended width without loss of fine definition, a helix of more than two turns must be used to avoid use of a drum having an impractically large diameter. Also the associated linear electrode must be suitably shaped or curved. By employing the construction shown in Fig. 3, it is possible to obtain an electrode contact area which is substantially square or rectangular with a drum of reasonably small diameter and of relatively long axial length. The modification of the invention shown in Fig. 3 employs a helix having more than two turns mounted on the drum 10. Cams 15A and 16A are disposed 180° apart and rotate as indicated by the arrows in Figs. 3A and 3B. The cams bear against the projecting arms 27, 28 of electrode carrier 29. The springs 30, 31 insure firm contact between the edges of the cams and the carrier arms 27, 28. A linear electrode 32 having a curved edge is mounted at the bottom edge of carrier 29. As the cams 15A, 16A rotate in coordination with the helical electrode 25, the single area of contact between the electrodes 25, 32, travels from one end to the other of helical electrode 25. When the other end of the helix is reached the marking of a line on the recording medium 24 is concluded. The cams are so shaped that the curved electrode 32 is then very quickly snapped back under the compression of spring 30 and the tension of spring 31 to contact the helix 26 at the beginning of a new marking line. The recording sheet 24 is of course advanced the space of one line to present a new marking area to the electrodes. The substantially instantaneous return of the area of contact between the electrodes from the end of the marked line to the beginning of a new line is essential in both the arrangements shown in Figs. 1 and 3 and is accomplished by the suitable shaping of the cams. Since the linear electrode 32 is curved, only a single area of contact exists between the electrodes at all positions of the helical electrode, and the electrodes intersect at an angle approaching 90°. In order to insure that the area of contact traverses the helical electrode once for each rotation of the cams, the drum 26 is rotated a number of times equal to the number of complete turns of the helix, while the cams rotate once. This is accomplished by a suitable gearing between the driving motor, the drum, and the cams.

It is an important feature of the present invention that the recording edges of electrodes 12 and 32 are constrained to move in a plane including the axis of the associated helical electrode. For this reason the pins 23 and guiding slots 22 are provided. The slots 22 will of course be so shaped as to guide the linear electrode in a predetermined path in a plane of the axis of the helix as the electrode is translated in that plane. The motor used to drive the drum may be coupled directly thereto if desired, with a suitable gear arrangement provided for driving the cams at a reduced rate of angular speed.

The several modifications of the invention disclosed are to be taken only as examples of the invention. Other modifications will readily occur to those skilled in the art without departing from the scope of the invention as defined in the following claims.

I claim:

1. A facsimile recorder for electrically marking a recording sheet disposed between electrodes, comprising a rotatable multiturn helical electrode, a rockably mounted linear electrode associated therewith, and cam means for rocking the linear electrode continuously to contact, in the absence of the sheet, a single elemental portion of the helical electrode from end to end thereof for substantially all positions of said helical electrode to mark a substantially rectangular area of the recording sheet when said sheet is disposed between the electrodes.

2. A facsimile recorder for electrically marking a recording sheet disposed between electrodes, comprising a rotatable multiturn helical electrode, a rockably mounted linear electrode in contact with said helical electrode when the sheet is not disposed between said electrodes, and cam means for rocking the linear electrode to limit contact to a single area of contact of the helical electrode from end to end thereof at substantially all positions of the helical electrode.

3. A recorder for marking a recording sheet interposed between electrodes, comprising a rotatable multiturn helical electrode, a linear electrode mounted for rockable movement, and means operatively connected to said linear electrode to move the linear electrode continuously to contact, in the absence of the recording sheet, only a single elemental portion of the helical electrode from end to end thereof during rotation of the helical electrode for substantially every rotated position of said helical electrode.

4. A recorder for marking a recorder sheet interposed between electrodes, comprising a rotatable multiturn helical electrode, a straight linear electrode mounted for rockable movement substantially in a single plane, and means operatively connected to said linear electrode to move the linear electrode continuously to contact, in the absence of the recording sheet, a single elemental portion of the helical electrode from end to end thereof during rotation of the helical electrode, at least one of the electrodes being shortened sufficiently to limit said contact to a single portion of a single turn of the helical electrode at all positions of the helical electrode.

5. A recorder for marking a recording sheet interposed between electrodes, comprising a rotatable multiturn helical electrode, a linear electrode mounted for rockable movement substantially in a single flat plane, and means operatively connected to said linear electrode to move the linear electrode continuously to contact, in the absence of the recording sheet, a single elemental portion of the helical electrode from end to end thereof during rotation of the helical electrode, said linear electrode having an edge shaped to limit said contact to a single portion of a single turn of the helical electrode at all positions of the helical electrode.

6. A recorder for marking a recording sheet interposed between electrodes, comprising a rotatable multiturn helical electrode, a linear electrode mounted for rockable movement substantially in a single plane which includes the longitudinal axis of said helical electrode, and means operatively connected to said linear electrode to move the linear electrode substantially only in said single plane continuously to contact, in the absence of the recording sheet, a single elemental portion of the helical electrode from end to end thereof during substantially the entire rotation of the helical electrode.

7. In a facsimile recording system, the combination of a rotatable multiturn helical electrode, a linear electrode associated therewith, said linear electrode being mounted for rockable movement substantially in a single flat plane, a recording medium adapted to be disposed between the electrodes, and means operatively connected to said linear electrode and adapted to move the linear electrode continuously in contact with the helical electrode from end to end thereof, in the absence of said recording medium, to maintain a single elemental area of contact at substantially all positions of the helical and linear electrodes in the absence of said recording medium.

8. A facsimile recorder for electrically marking a recording sheet disposed between electrodes comprising a rotatable multiturn helical electrode, a rockably mounted linear electrode associated therewith, and cam means for rocking the linear electrode to contact, in the absence of the recording sheet, a single elemental portion of the helical electrode substantially for each angular position of said helical electrode, from end to end thereof to mark a substantially rectangular area of the recording sheet when said sheet is disposed between the electrodes, said cam means being adapted to rock the linear electrode substantially in a plane including the axis of the helical electrode.

9. A recorder for marking a recording sheet interposed between electrodes, comprising a rotatable multiturn helical electrode, an arcuate linear electrode mounted for rockable movement substantially in a single flat plane, and means operatively connected to said linear electrode to move the linear electrode continuously to contact, in the absence of the recording sheet, a single elemental portion of the helical electrode from end to end thereof during rotation of the helical electrode and movement of the linear electrode.

10. A facsimile recorder for electrically marking a recording sheet disposed between electrodes, comprising a rotatable multiturn helical electrode, a rockably mounted arcuate linear electrode associated therewith, and cam means for rocking the linear electrode continuously to contact, in the absence of the recording sheet, a single elemental portion of the helical electrode from end to end thereof to mark a substantially rectangular area of the recording sheet when said sheet is disposed between the electrodes.

References Cited in the file of this patent

UNITED STATES PATENTS

| | | |
|---|---|---|
| 2,104,109 | Young | Jan. 4, 1938 |
| 2,188,650 | Clark | Jan. 30, 1940 |
| 2,380,482 | Tribble | July 31, 1945 |
| 2,391,768 | Blain | Dec. 25, 1945 |
| 2,527,599 | Terry | Oct. 31, 1950 |
| 2,571,720 | Hunt | Oct. 16, 1951 |
| 2,686,706 | Young | Aug. 17, 1954 |

FOREIGN PATENTS

| | | |
|---|---|---|
| 286,694 | Switzerland | Mar. 2, 1953 |
| 748,262 | Great Britain | Apr. 25, 1956 |